(12) United States Patent
Gailloux et al.

(10) Patent No.: US 9,338,658 B1
(45) Date of Patent: May 10, 2016

(54) TELECOMMUNICATION SERVICE PROVIDER CUSTOMER ACCOUNT PORTAL FOR STRATEGIC PARTNERS

(71) Applicant: Sprint Communications Company L.P., Overland Park, KS (US)

(72) Inventors: Michael A. Gailloux, Overland Park, KS (US); Lauren Ricardo St. Aubyn King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 32 days.

(21) Appl. No.: 14/497,309

(22) Filed: Sep. 25, 2014

(51) Int. Cl.
*H04M 11/00* (2006.01)
*H04W 12/12* (2009.01)
*H04M 15/00* (2006.01)
*H04W 4/12* (2009.01)

(52) U.S. Cl.
CPC .............. *H04W 12/12* (2013.01); *H04M 15/47* (2013.01); *H04W 4/12* (2013.01)

(58) Field of Classification Search
CPC ........ H04W 12/12; H04W 4/12; H04M 15/47
See application file for complete search history.

(56) References Cited

U.S. PATENT DOCUMENTS

| | | | |
|---|---|---|---|
| 5,448,760 A * | 9/1995 | Frederick | H04W 12/12 380/250 |
| 5,602,906 A | 2/1997 | Phelps | |
| 5,970,129 A | 10/1999 | Asfar et al. | |
| 6,188,753 B1 | 2/2001 | Asfar et al. | |
| 6,307,926 B1 | 10/2001 | Barton et al. | |
| 6,373,935 B1 | 4/2002 | Afsar et al. | |
| 8,359,006 B1 | 1/2013 | Zang et al. | |
| 8,386,386 B1 | 2/2013 | Zhu | |
| 8,413,234 B1 * | 4/2013 | Zang | H04L 63/1425 726/22 |
| 8,463,237 B1 | 6/2013 | Zang et al. | |
| 8,554,912 B1 | 10/2013 | Reeves et al. | |
| 8,655,314 B1 | 2/2014 | Zang et al. | |
| 8,682,293 B1 | 3/2014 | Zang et al. | |
| 2006/0009195 A1 | 1/2006 | Itoh | |
| 2008/0242405 A1 | 10/2008 | Chen et al. | |
| 2008/0310608 A1 | 12/2008 | Johnson et al. | |

(Continued)

OTHER PUBLICATIONS

Zang, Hui, et al., Patent Application entitled "Data Fraud Detection via Device Type Identification," filed Jul. 27, 2012, U.S. Appl. No. 13/560,277.

(Continued)

*Primary Examiner* — Kashif Siddiqui

(57) ABSTRACT

An evaluation server is disclosed. The server comprises a processor, a memory, and an application stored in the memory. The application receives a request from an enterprise new accounts sever to predict the trustworthiness of an account applicant. The application then accesses a plurality of mobile communication service provider data stores that comprise information on mobile communication service provisioning events, wherein these events comprise at least one of voice mail redirect events of the mobile communication device, changing out of the mobile communication device for other mobile communication devices events, payment history, and adding international calling service events. The application then generates a confidence report about the trustworthiness of the account applicant based on the information found in the plurality of data stores. The application then transmits the confidence report to the enterprise server.

20 Claims, 4 Drawing Sheets

(56) References Cited

U.S. PATENT DOCUMENTS

2009/0006230 A1* 1/2009 Lyda .................. G06Q 40/00
705/35
2010/0145771 A1 6/2010 Fligler et al.

OTHER PUBLICATIONS

First Action Interview Pre-Interview Communication dated Jul. 16, 2014, U.S. Appl. No. 13/560,277, filed Jul. 27, 2012.

* cited by examiner

US 9,338,658 B1

TELECOMMUNICATION SERVICE PROVIDER CUSTOMER ACCOUNT PORTAL FOR STRATEGIC PARTNERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises, for example financial services enterprises, may wish to aggressively expand the number of subscribers that register for their services. Sometimes fraudulent subscribers may attempt to register for services from enterprises. Fraudulent subscribers may sign up for the services of enterprises and then not reimburse the enterprises for their services. Enterprises may wish to avoid these fraudulent subscribers and have viable subscribers register for their services.

SUMMARY

In an embodiment, an evaluation server is disclosed. The evaluation server comprises a processor, a memory, and an application stored in the memory. The application when executed by the processor receives a request from an enterprise new accounts server to predict the trustworthiness of an account applicant, wherein the account applicant inputs information about a mobile communication device associated with the applicant to the enterprise new accounts server. The applicant then accesses a plurality of mobile communication service provider data stores that comprise information on mobile communication service provisioning events, wherein these events comprise at least one of voice mail redirect events of the mobile communication device, changing out of the mobile communication device for other mobile communication device events, payment history, and adding international calling service events. The application then generates a confidence report about the trustworthiness of the account applicant based on the information found in the plurality of data stores. The application then transmits the confidence report to the enterprise server.

In an embodiment, a method of predicting trustworthiness in account applicants using an evaluation application is disclosed. The method comprises an evaluation application of an evaluation server receiving a request from an enterprise new accounts server to check the trustworthiness of the account applicant, wherein the account applicant inputs information about a mobile communication device associated with the applicant to the enterprise new accounts server, wherein the evaluation application is stored in a memory of the evaluation server and executed by at least one processor of the evaluation server. The method further comprises using the information in the request to identify a subscriber account of the account applicant by the evaluation application. The method further comprises validating the account applicant by matching two or more of a name of the account applicant, a postal address of the account applicant, or a phone number of the account applicant by the evaluation application. The method further comprises the evaluation application accessing a plurality of mobile communication service provider data stores that comprise information on one or more of mobile communication service provisioning events, wherein these events comprise at least one of voice mail redirect events of the mobile communication device, a history of the changing out of the mobile communication device for other mobile communication device events, a payment history associated with the mobile communication device events, and adding international calling service events. The method further comprises the application generating a confidence report about the trustworthiness of the prospective account based on the information found in the plurality of data stores. The method further comprises the evaluation application transmitting the confidence report to the enterprise new accounts server.

In an embodiment, a method of evaluating fraud probability in account applicants using an evaluation server is disclosed. The method comprises an evaluation server receiving a request from an enterprise new accounts server to match a mobile communication device to an account applicant, wherein the account applicant inputs information about a mobile communication device associated with the applicant to the enterprise new accounts server. The method further comprises the evaluation server accessing a device and number management and trustworthiness data store, wherein the device and number management and trustworthiness data store comprises information about the status of the mobile communication device of the account applicant and information about use of the mobile communication device by the account applicant to be correlated with untrustworthiness, wherein the information in the device and number management and trustworthiness data store is associated with a mobile communication service provider. The method further comprises after accessing the data in the device and number management and trustworthiness data store, the evaluation server transmitting the data received from the device and number management and trustworthiness data store to the enterprise new accounts server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
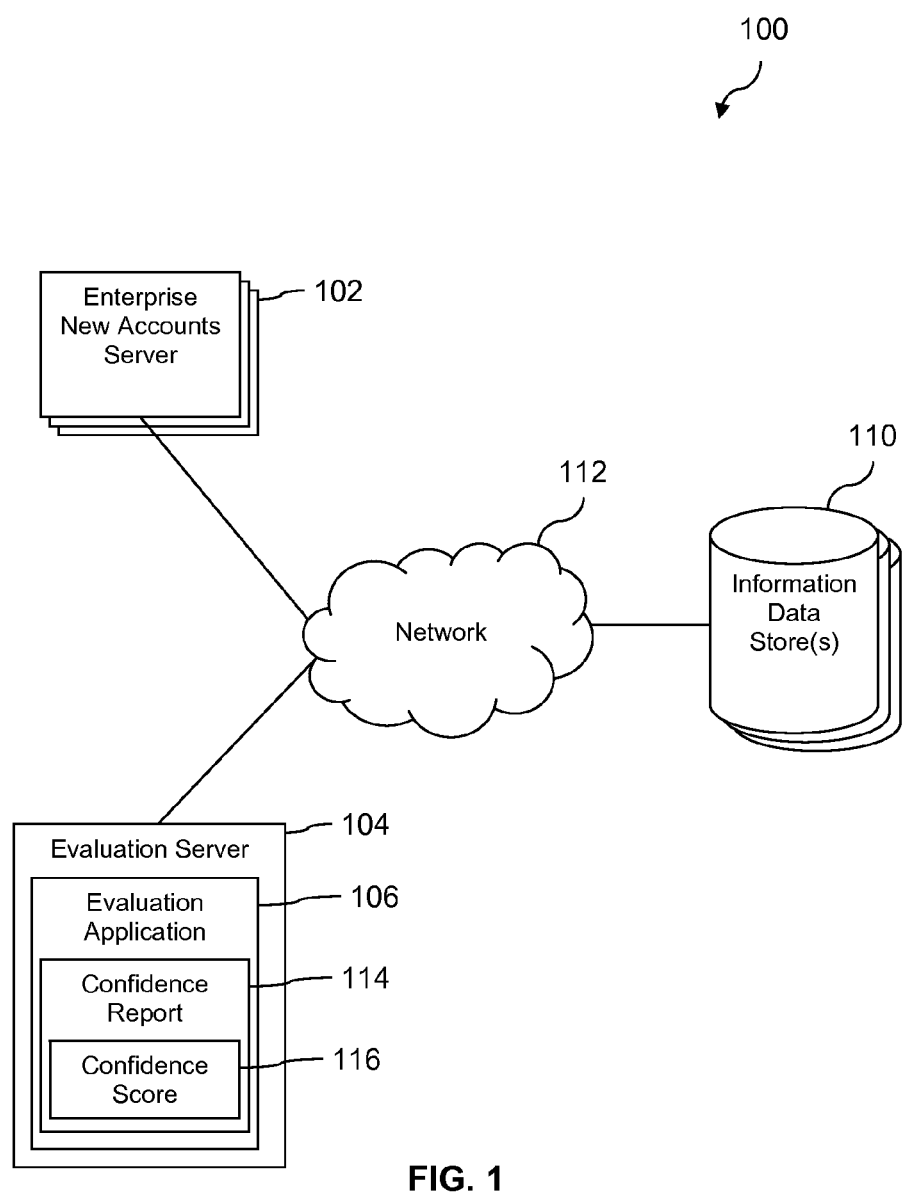
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for predicting trustworthiness in account applicants using an evaluation server system of a mobile communication service provider or a telecommunications service provider. In the past, enterprises may have allowed applicants to register for services with limited knowledge of the applicant's trustworthiness.

Trustworthiness as used herein is a relative term. Generally this term speaks to the prudence of granting to an individual access to more or less powerful functions or confidential information. Usually, the determination that an individual is trustworthy or not trustworthy depends on the magnitude of the risk involved or the worst case scenario if the trust is misplaced. For example, is a Mr. X trustworthy enough to let him deliver newspapers? Probably. The worst case is that a car load of newspapers is lost: not a large capital investment. Is the same Mr. X trustworthy enough to let him courier bank deposits in an armored car? Maybe not. Naturally, the armored car company would want to make a diligent investigation of Mr. X's background and job history before entrusting him with possibly hundreds of thousands of dollars of their clients' money. In the present disclosure, the question of trustworthiness is relative to the potential damage that a new account holder may do. For example, the trustworthiness also may be relative to an account credit limit or a financial transaction money limit. For example, the trustworthiness may be relative to a waiting period before funds from a deposited check are available for disbursement from the account. For different enterprises and for different levels of privileges, the scale of trustworthiness for account holders naturally may be different.

Trustworthiness may be associated with the lack of any negative or dubious behavior or history of the individual being evaluated. Trustworthiness may be associated with the lack of any history of conduct that has an elevated correlation with fraudulent behavior or identity theft. It is noted that conduct that has an elevated correlation with fraudulent behavior or identity theft is not the same as performing fraud or identity theft. For example, entering the wrong password when attempting to access a privileged account of a computer can be said to have an elevated correlation with fraud ("hacking" into a computer system), but by the same token most of us, one time or another, have mistyped our password when logging on to our computers. Untrustworthiness may be associated with the presence of negative or dubious behavior or history. The number and type of negative or dubious behavior or history and the concomitance in time of two or more of these can be used to evaluate the trustworthiness of an account applicant. If an account applicant is deemed "untrustworthy," the enterprise may follow-up with the account applicant to make a more thorough investigation, possibly asking the account applicant to explain the negative or dubious behavior or history.

Accepting applicants to register for services without knowing their trustworthiness and without a history of transactions of the applicant may leave enterprises vulnerable to fraudulent activity by an untrustworthy applicant. Mobile communication service providers may possess special knowledge about their subscribers that may be leveraged to assist other enterprises in evaluating the trustworthiness of applicants who open accounts at various enterprises unassociated with the mobile communication service provider. Mobile communication service providers may have call records of applicants, payment histories of the applicants, and other pertinent information that may usefully be analyzed for enterprises to use to evaluate trustworthiness of applicants. The evaluation server system of a mobile communication service provider taught herein allows enterprises to confirm an identity of an account applicant and allows enterprises to evaluate the account applicant based on a confidence report generated by the evaluation server system that gives a score to the trustworthiness of the account applicant.

Confidence, like trustworthiness, is a relative term. The confidence may be relative to the amount of privilege or trust extended to the account applicant. The confidence may be higher when less privilege or trust is extended (lower credit balance limit, longer wait time before accessing deposited checks) and lower, for the same individual and for the same behavior history, when more privilege or trust is extended. Confidence may be greater when less behavior correlated with fraud or identity theft occurs or occur less often. For example, if an individual mistypes their password less than 12 times per year, that behavior, though correlated with fraud, may not diminish the confidence in that individual significantly. On the other hand, if an individual mistypes a password 50 times in a period of minutes, that behavior might justly diminish the confidence in that individual significantly. Confidence is associated with trustworthiness, in that one is confident in an account applicant who is deemed trustworthy.

In an embodiment, an evaluation program or application executing on a server computer receives a request from an enterprise to predict the trustworthiness of a new account applicant. The account applicant inputs information to the enterprise about a mobile communication device that is associated with the applicant. The enterprise may send a request to the evaluation program to evaluate the applicant and/or the applicant's information.

In an embodiment, the enterprise may request the evaluation program to pull all information related to the account applicant. The evaluation program may access a plurality of information data stores and find information that is associated with the mobile communication device that was inputted by the account applicant. The evaluation program may look for information in the plurality of information data stores that may comprise one or more of name of the account applicant, the address of the account applicant, and other information. After pulling the information from the plurality of information data stores, the evaluation program transmits the pulled information to the enterprise. The enterprise may use the pulled information to evaluate whether the account applicant is trustworthy or not trustworthy.

In another embodiment, the enterprise may send all of the information inputted by the account applicant to the evaluation program. The evaluation program may receive the inputted information of the account applicant and access the plurality of information data stores and match the inputted information to the available information in the plurality of information data stores. Once the evaluation program makes its matches, it sends the found information back to the enterprise that shows the information that matches and the information that does not match. The enterprise may use this pulled information and evaluate whether or not they find the account applicant to be trustworthy or not trustworthy.

To predict the trustworthiness of the account applicant, the evaluation program accesses the plurality of information data stores that may comprise information on one or more of voice mail redirect events of the mobile communication device, changing out of the mobile communication device for other mobile communication devices events, payment history, and adding international calling service events. Here, "changing out of the mobile communication device for other mobile communication devices" simply means the individual has changed their phone (e.g., replaced a first mobile phone by a second mobile phone).

A pattern of these events may correlate with subsequent untrustworthy activity by a subscriber. In an embodiment, the proximity in time of the events to the time of account application may be taken into consideration. The data stores may also comprise information about the applicant about changed addresses, suspension of the line for the mobile communication device of the applicant, etc. In an embodiment, there may be one data store that comprises the listed information. The evaluation program may look up the applicant in a variety of ways that comprise mapping a land line to an account of the applicant, mapping the applicant's name to the account, mapping the address of the applicant to the applicant. This information may be compared to the information provided by the applicant. If the evaluation program does not corroborate information provided by the applicant, that may be deemed a strong predictor of fraud. The enterprise may ask the applicant to verify his or her identity fully. It is understood that the evaluation program may detect and ignore trivial typographic errors.

The timing of the events may be pertinent to and affect the evaluation of the trustworthiness of the account applicant. If an account applicant were to have an event of adding international calling services more than a year before applying for an account, there is probably no reason for this event to impact the enterprise's assessment of his or her trustworthiness. Said in other words, there would likely not be a correlation between adding international services over a year ago and untrustworthy behavior in the present or future. There may also be a correlation between adding international services recently and untrustworthy behavior in an account being opened. This may be because one of the methods of identity theft involves transferring cash from US accounts to foreign accounts via international calling services using mobile phones. This method typically involves adding international calling services, transferring the cash promptly thereafter, and abandoning the phone. Again, it is noted that a correlation does not prove or suggest a causal link but only an elevated rate of occurrence of fraud.

The evaluation program generates a confidence report and/or a confidence score about the trustworthiness of the new account applicant based on analyzing the information found in the plurality of data stores. In an embodiment, the confidence report comprises a confidence score that is determined as a weighted sum of confidence factors. Confidence factors may comprise the presence or absence of voice mail redirect events, changing out of mobile communication device events, payment history and adding international calling service events. Each of the factors may be given a predetermined different weight of importance. Different enterprises may give different predetermined weights to the factors, for example based on the magnitude of trust (or the amount of potential harm that can be inflicted) that they extend to their account applicants. Said in other words, a different correlation may be observed between the different events and untrustworthy behavior, and this leads to different weighting of the factors in generating the confidence score.

The evaluation program then transmits the confidence report to the enterprise. Enterprises may use the confidence report to evaluate the account applicant by assessing the trustworthiness score reported of the account applicant. If the confidence report comes back with a score that indicates trustworthiness, enterprises may allow the applicant to register for their services. If the confidence report comes back with a score that indicates untrustworthiness, enterprises may try to gather more information about the applicant or may deny the applicant acceptance in registering for their services.

The evaluation program application allows enterprises to better evaluate account applicants that attempt to register for their services and better assess whether the applicants are trustworthy or untrustworthy based on the confidence report that the evaluation program generates. The evaluation program may confirm the identities of account applicants, compile and evaluate the activities that applicants have engaged in from a mobile communication service provider frame of reference, and generate a confidence report with a confidence score that predicts trustworthiness or untrustworthiness of the applicant.

Turning now to FIG. 1, a communication system 100 is described. The system 100 comprises an enterprise new accounts server 102, an evaluation server 104, a plurality of information data stores 110, and a network 112. The evaluation server 104 further comprises an evaluation program or application 106 and a confidence report/score 114/116. The enterprise new accounts server 102, the evaluation server 104, and the plurality of information data stores 110 are communicatively coupled to the network 112.

The enterprise new accounts server 102 may be communicatively coupled to web pages that may be accessed by subscribers to mobile communication services. These subscribers may register for services that are displayed on the web pages. When the subscribers input information about themselves to the web pages, they become account applicants. The information that the account applicants input on the web pages are submitted to the enterprise new accounts server 102. The enterprise new accounts server 102 then sends a request for an evaluation from the evaluation program 106. The request includes the information about the account applicant that the evaluation program 106 of the evaluation server 104 uses to pull information about the account applicant. In an embodiment, the evaluation server 104 may be associated with a telecommunication service provider.

There may be an enterprise that is associated with the enterprise new accounts server 102 that may decide it wants to match the mobile communication device to the account applicant that the account applicant inputted as their mobile communication device and find out some other general information about the account applicant. If this is the case, the evaluation program 106 accesses the plurality of information data stores 110 based on the applicant's phone number and pulls or reads information about the account applicant which may comprise the name of the account applicant, the address of the account applicant, the contact number of the mobile communication device of the account applicant, the payment history of the mobile communication device and the account applicant, and other information. In an embodiment, the evaluation program 106 transmits the pulled information to the enterprise new accounts server 102 where the enterprise that is associated with the enterprise new accounts server 102 may evaluate the information and decide if they find the account applicant either trustworthy or untrustworthy based on the pulled information matching the information that the account applicant inputted to the enterprise new accounts server 102. The information in the plurality of information data stores 110 associated with the account applicant may alternatively be referenced or looked-up based on other information provided by the applicant to the enterprise or the enterprise new accounts server 102, for example the name of the account applicant, the address of the account applicant, or other personal information.

The enterprise may prefer to receive the confidence report 114 with the confidence score 116 from the evaluation program application 106 rather than to receive raw data that it must process and evaluate. The confidence report 114 is a summary report based on available information related to a mobile communication device of the account applicant stored to the plurality of information data stores 110. The evaluation program 106 evaluates that information and gives the confidence score 116 to indicate trustworthiness or untrustworthiness of the account applicant. In an embodiment, there may be an option for subscribers to approve or disapprove the generation of the confidence report 114 and confidence score 116 associated with them and sharing the confidence report 114 and confidence score 116 with the enterprise for whose services the subscribers are signing up. The mobile communication service provider may also be wary of providing raw data to enterprises for a variety of reasons including preserving the privacy of their subscribers. There also may be an option for the account applicant to approve or disapprove the sharing of the data associated with them to enterprises that inquire with the evaluation server 104.

The evaluation program application 106 receives the request for a confidence report 114 for the account applicant and begins to access available information in the plurality of information data stores 110. The request comprises some information that may be used to select information from the data stores 110, for example a phone number, a name, an address, or other personal information of the account applicant. The plurality of information data stores 110 may comprise information about one or more of voice mail redirect events of the mobile communication device, changing out of the mobile communication device for other mobile communication devices events (e.g., replacing a first mobile phone with a second mobile phone), payment history of the mobile communication device and the account applicant, adding international calling service events, and other information. In an embodiment, the information in the plurality of information data stores 110 has a time to live value. The time to live value of the information in the plurality of information data stores 110 may be a month, 2 months, 6 months, a year, or other values as determined by a telecommunication service provider. If the information in the plurality of information data stores 110 has expired, the enterprise that gets the confidence report 114 from the evaluation program 106 may not take the information into consideration. If the time to live value has not expired, the enterprise that gets the confidence report 114 may take the information into further consideration in their evaluation of the account applicant and prediction of whether they are trustworthy or untrustworthy. For example, if an account applicant has been late on payments in a time period where the information of the event has not expired in the plurality of information data stores 110, the enterprise that is evaluating the account applicant may consider the account applicant untrustworthy and may not accept the account applicant's application.

With the available information, the evaluation program 106 generates the confidence report 114 with the confidence score 116 that indicates trustworthiness or untrustworthiness of the account applicant. In an embodiment, the confidence score 116 may be scored in a range from 0-100 where a score of 0 indicates that the applicant is predicted to be entirely untrustworthy and a score of 100 indicates that the applicant is predicted to be entirely trustworthy. In an embodiment, there may be other ranges. The evaluation program 106 then transmits the confidence report 114 to the enterprise new accounts server 102. Enterprises that are associated with enterprise new accounts server 102 may use the confidence report 114 to evaluate the account applicant based on the confidence score 116 reported for the account applicant. If the confidence report 114 comes back with a confidence score 116 that indicates a substantial level of trustworthiness, enterprises may allow the applicant to register for their services. If the confidence report 114 comes back with a confidence score 116 that indicates a substantial level of untrustworthiness, enterprises may try to gather more information about the applicant or may deny the applicant acceptance in registering for their services. The network 112 may be a private network, a public network, or a combination thereof.

In an embodiment, the evaluation program 106 is executed by a processor of the evaluation server 104 when it receives a request from the enterprise new accounts server 102 to predict the trustworthiness of a new account applicant. The account applicant may input information about a mobile communication device associated with the account applicant to the enterprise new accounts server 102. The enterprise new accounts server 102 may be associated with an enterprise that requests information about account applicants that attempt to register for their services and sends the inputted information from the account applicant with the request it sends to the evaluation program 106.

Once the evaluation program 106 receives the request, the evaluation program 106 accesses the plurality of data stores 110. In an embodiment, the information may be located in one data store. The plurality of data stores 110 may comprise information associated with the mobile communication device of the account applicant. The information may comprise voice mail redirect events of the mobile communication device, changing out of the mobile communication device for other mobile communication devices events, payment history of the mobile communication device and the account applicant associated with the mobile communication device, adding international calling services events of the mobile communication device, and other information. In an embodiment, the evaluation server 104 and the plurality of information data stores 110 may be associated with a mobile communication service provider which may have access to information like voice mail redirect events of the mobile communication device, changing out of the mobile communication device for other mobile communication devices events, payment history of the mobile communication device, and adding international calling service events of the mobile communication device.

From the available information, the evaluation program application 106 generates a confidence report 114 with the confidence score 116. The confidence report/score 114/116 is related to the predicted trustworthiness of the new account applicant based on the information found in the plurality of data stores 110. In an embodiment, the confidence report/score 114/116 comprises a confidence score (e.g., a number) that is a weighted sum of confidence factors. Thus, the confidence factors may each be a numeric value constrained to a pre-defined value range. A voice mail redirect events confidence factor may be given a value in the range of 0 to 1, or some other constrained value range. A changing out of mobile communication device events confidence factor may be given a value in the range 0 to 1, or some other constrained value range. An adding international calling service events confidence factor may be given a value in the range 0 to 1, or some other constrained value range. Each confidence factor may be multiplied by a coefficient or weight to produce a product that may be referred to as a weighted factor. Then the products or weighted factors may be summed to produce the weighted sum. In an embodiment, the weighting coefficients may be selected so that the weighted sum is constrained to a maximum value. For example, in an embodiment, the sum of the weighting factors may be unity or 1. In an embodiment, a confidence score of 0 may be associated with very high trustworthiness of an account applicant and a confidence score of 1 may be associated with very low trustworthiness of the account applicant. Alternatively, this polarity may be reversed, and a confidence score of 0 may be associated with a very low trustworthiness of the account applicant and a confidence score of 1 may be associated with a very high trustworthiness of the account applicant.

Confidence factors may comprise the voice mail redirect events, changing out of mobile communication device events, payment history associated with the mobile communication device, and adding international calling service events. Each of the factors may be given a different predetermined weight of importance as determined by the enterprise associated with the enterprise new accounts server 102 (different enterprises may define different predetermined weights for factors) or as determined by the telecommunication service provider. The evaluation program 106 then transmits the confidence report/score to the enterprise new accounts server 102. In an embodiment, the evaluation program 106 may transmit the confidence report 114 in less than a second to the enterprise new accounts server 102.

In an embodiment, the evaluation application 106 may look up the account applicant in a variety of ways that comprise mapping a land line to a mobile communication service provider account of the applicant, mapping the account applicant's name to the account, and mapping the address of the account applicant using the information in the plurality of data stores 110. The plurality of information data stores 110 may also comprise information about the applicant that comprises changed addresses, and suspension of a telecommunication service provider line for the mobile communication device of the account applicant.

In another embodiment, the evaluation application 106 may receive the contact number of the mobile communication device of the account applicant from the enterprise new accounts server 102. The enterprise associated with the enterprise new accounts server 102 may request the evaluation application 106 to pull all of the information associated with the given mobile communication device. The evaluation application 106 may access the plurality of information data stores 110 and pull all of the information that is associated with the mobile communication device which may comprise one or more of name of the account applicant associated with the mobile communication device, address of the individual associated with the mobile communication device, and other information. The evaluation application 106 may transmit the pulled information to the enterprise new accounts server 102 where the enterprise associated with the enterprise new accounts sever 102 may evaluate the pulled information and decide whether the account applicant is predicted to be trustworthy or not trustworthy.

Figure 2:
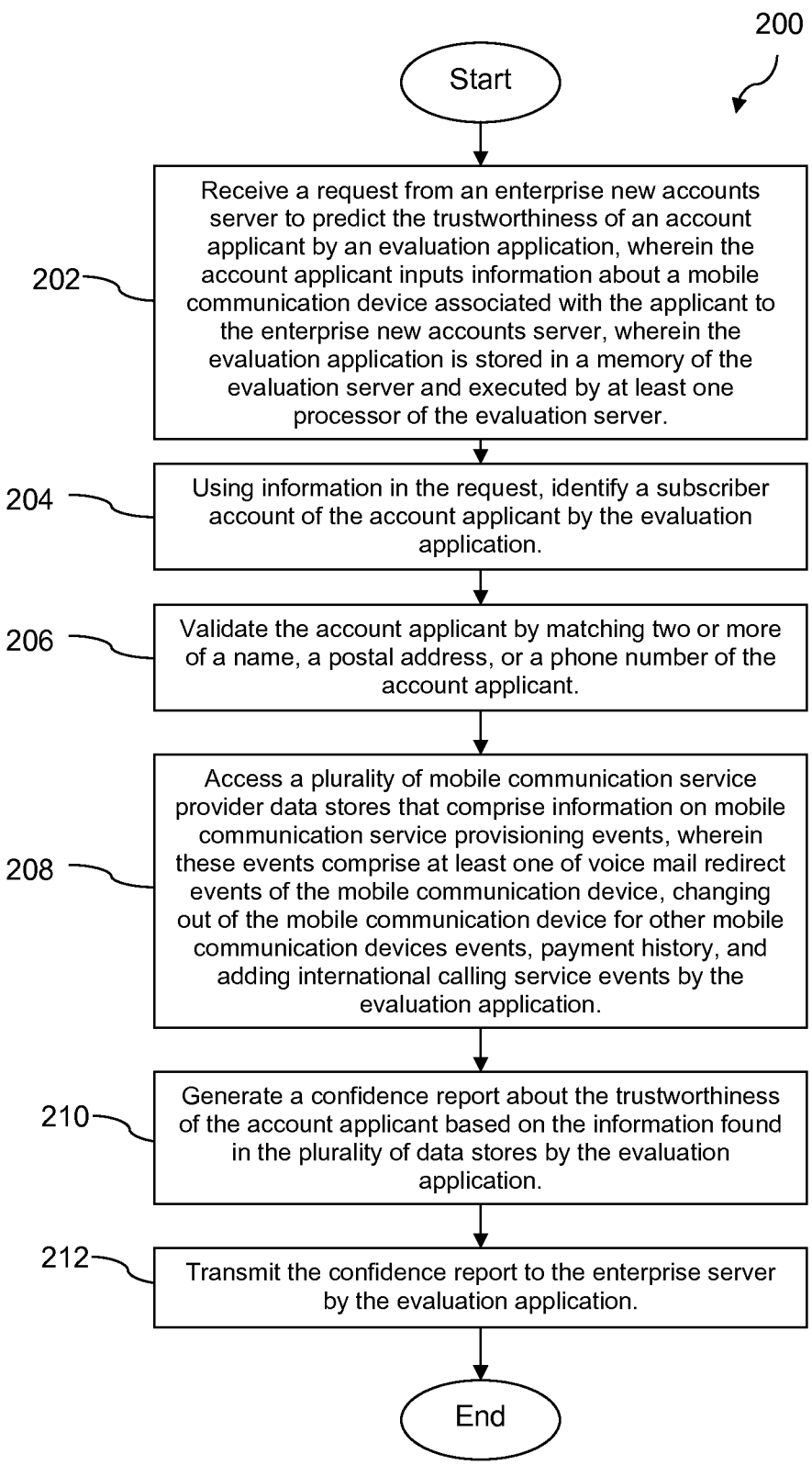
FIG. 2 is a flow chart of a method according to an embodiment of the disclosure.

In FIG. 2, a method 200 is described. At block 202, an evaluation program or application receives a request from an enterprise new accounts server to predict the trustworthiness of an account applicant, wherein the account applicant inputs information about a mobile communication device associated with the applicant to the enterprise new accounts server, wherein the evaluation application is stored in a memory of the evaluation server and executed by at least one processor of the evaluation server. At block 204, using the information in the request, the evaluation application identifies a subscriber account of the account applicant, for example a mobile communication service subscriber account. At block 206, the evaluation application validates the account applicant by matching two or more of name of the account applicant, postal address of the account applicant, or phone number of the account applicant.

As used herein, 'validates the account applicant' means assuring that the information provided by the account applicant to the enterprise corresponds substantially with information associated with the subscriber account. If the account applicant is validated, processing may proceed to block 208. If the account applicant is not validated, processing may follow a different course. For example, if the account applicant is not validated, the evaluation application may return a result of "not validated" to the enterprise new accounts server. The account applicant may be refused an account. Alternatively, the account applicant may be challenged to correct or explain the discrepancy between the information the applicant provided when applying to open the account and the information provided by the evaluate application. It may be that the discrepancy is easily explained and/or easily corrected. On the other hand, the failure of applicant validation may prevent a nefarious actor from opening a new account and committing fraud. If the discrepancy is corrected, the process may be restarted from block 202 by the enterprise new accounts server or possibly may be reentered at block 204 or at block 206.

At block 208, based on the request, the evaluation application accesses a plurality of data stores that comprise information on one or more of voice mail redirect events of the mobile communication device, changing out of the mobile communication device for other mobile communication devices events, payment history, and adding international calling service events. For example, the request comprises a phone number of the applicant, and the evaluation application accesses information from data stores based on the phone number. Alternatively, the request comprises other personal information about the account applicant that may be used to select information from the data stores 110, for example a name, an address, or other personal information of the account applicant. At block 210, the evaluation application generates a confidence report about the trustworthiness of the account applicant based on the information found in the plurality of data stores. At block 212, the evaluation application transmits the confidence report to the enterprise server In an embodiment, the enterprise uses the confidence report to determine whether it will open an account, not open an account, or to look up more information about the account applicant. For example, in response to receiving the confidence report with a favorable confidence score, the enterprise may open the new account for the account applicant based on the confidence report. In another example, in response to receiving the confidence report with an unfavorable confidence score the enterprise may turn down the account applicant and may not open a new account for the account applicant based on the confidence report. In an embodiment, the opening or non-opening of the account based on the confidence report may be performed by a server computer, for example, the enterprise new accounts server 102. In an embodiment, if the confidence report has an intermediate score, the enterprise may contact the account applicant and attempt to evaluate the applicant directly, via a phone interview. Alternatively, the enterprise new accounts server may request the account applicant to provide further information or proofs of trustworthiness. The enterprise new accounts server may adapt the kind of account the account applicant may be permitted to open. For example, the enterprise new accounts server may open a new account for the applicant but with a lowered transaction limit, with a lower credit limit, with a longer wait time before crediting deposited checks to the available funds balance of the account, and like limitations directed to constraining the exposure to loss by the enterprise. After the account holder has established a track record of good behavior, the limits and/or restrictions associated with the account may be reduced or eliminated.

Figure 3:
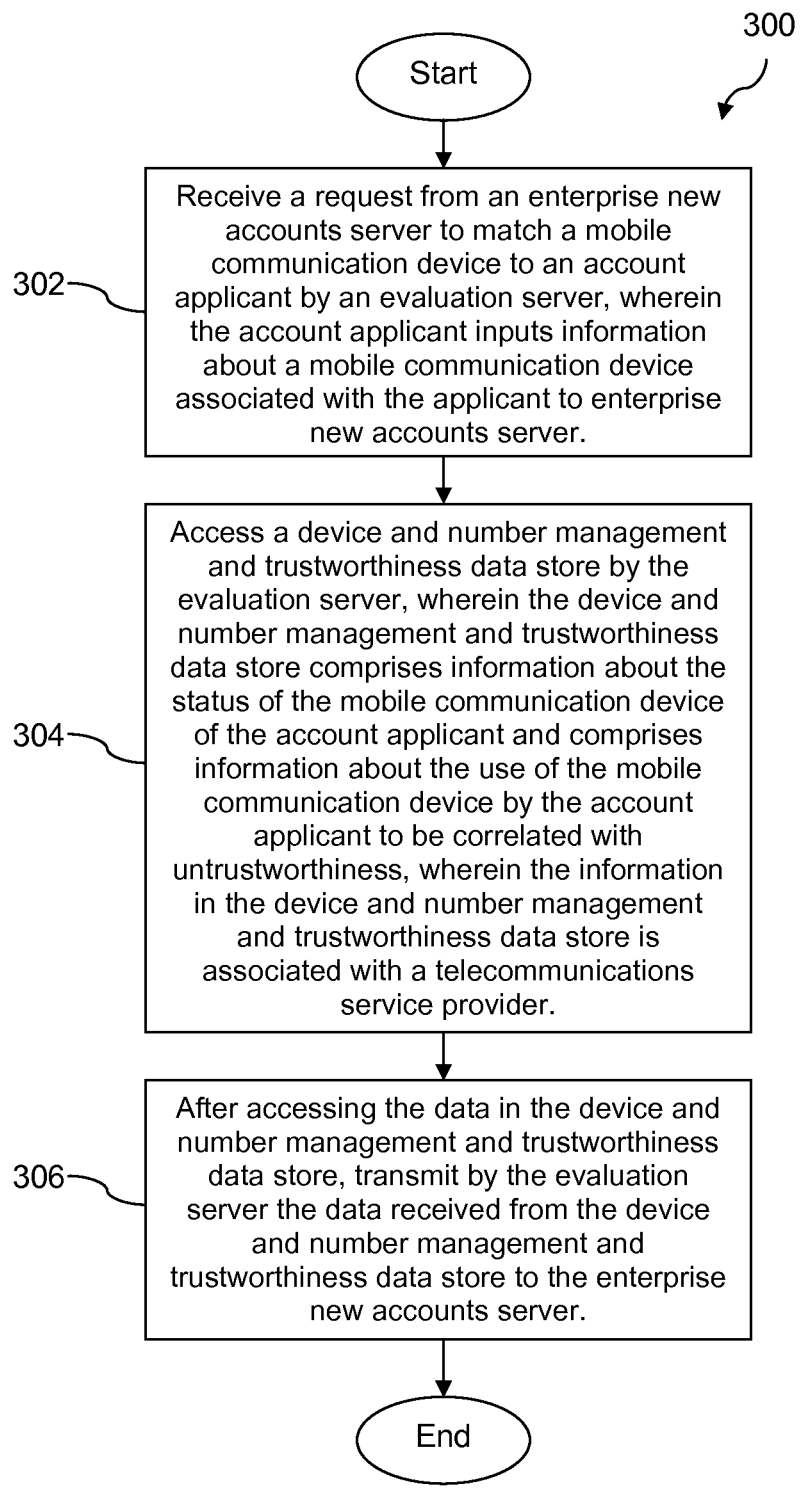
FIG. 3 is a flow chart of a method according to an embodiment of the disclosure.

In FIG. 3, a method 300 is described. At block 302, an evaluation server receives a request from an enterprise new accounts server to match a mobile communication device to an account applicant, wherein the account applicant inputs information about his or her mobile communication device to the enterprise new accounts server. At block 304, the evaluation server accesses a device and number management and trustworthiness data store, wherein the device and number management and trustworthiness data store comprises information about the status of the mobile communication device or the account applicant and comprises information about use of the mobile communication device by the account applicant. In an embodiment, untrustworthy use of the mobile communication device comprises a history of late payments by the account applicant, payments that weren't made by the account applicant, and voice mail redirect events of the account applicant. The device and number management and trustworthiness data store may further comprise a contact number of the mobile communication device of the account applicant, an address of the account applicant, and/or a contact number of the mobile communication device of the account applicant. At block 306, after accessing the data in the device and number management data store and the trustworthiness data store, the evaluation server transmits the data received from the device and number management data store and the trustworthiness data store to the enterprise new accounts server. In an embodiment, there may be multiple enterprises that are associated with the enterprise new accounts server.

Figure 4:
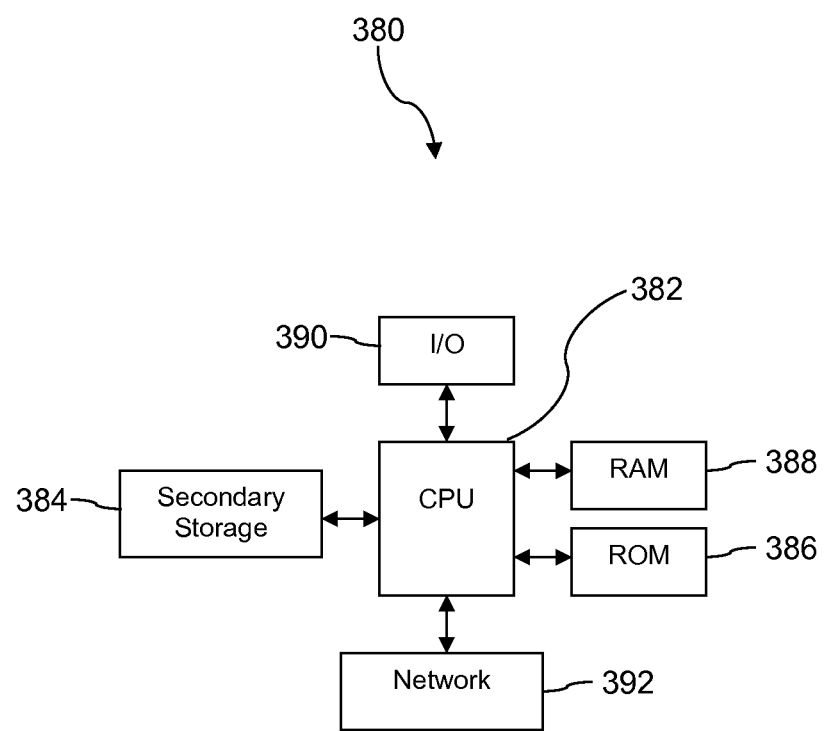
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An evaluation server, comprising:
a processor,
a memory,
an application, stored in the memory, that when executed by the processor,
receives a request from an enterprise new accounts server to predict the trustworthiness of an account applicant, wherein the account applicant inputs information about a mobile communication device associated with the account applicant to the enterprise new accounts server,
accesses a plurality of mobile communication service provider data stores that comprise information on mobile communication service provisioning events, wherein these events comprise at least one of voice mail redirect events of the mobile communication device, changing out of the mobile communication device for other mobile communication devices events, payment history, and adding international calling service events,
generates a confidence report about the trustworthiness of the account applicant based on the information found in the plurality of data stores, and
transmits the confidence report to the enterprise server.

2. The system of claim 1, wherein the confidence report comprises a confidence score that is determined as a sum of factors, wherein the factors each have a numeric value constrained to a pre-defined value range, wherein the factors comprise a voice mail redirect events numeric value, a changing out of mobile communication device events numeric value, and an adding international calling service events numeric value.

3. The system of claim 2, wherein the confidence score is a weighted sum of factors.

4. The system of claim 3, wherein the sum of the factors has a value within a range of 0-100.

5. The system of claim 1, wherein the evaluation application looks up information associated to the account applicant in the plurality of mobile communication service provider data stores by one of mapping a land line to a telecommunication service provider account of the account applicant, mapping the account applicant's name to the telecommunication service provider account, mapping the address of the account applicant to the account applicant.

6. The system of claim 5, wherein the plurality of mobile communication service provider data stores comprise information about the account applicant that comprises changed addresses, suspension of a telecommunication service provider line for the mobile communication device of the account applicant.

7. A method of predicting trustworthiness in account applicants using an evaluation application, comprising:
receiving a request from an enterprise new accounts server to predict the trustworthiness of an account applicant by an evaluation application of an evaluation server, wherein the account applicant inputs information about a mobile communication device associated with the account applicant to the enterprise new accounts server, wherein the evaluation application is stored in a memory of the evaluation server and executed by at least one processor of the evaluation server,
using the information in the request, identifying a subscriber account of the account applicant by the evaluation application,
validating the account applicant by matching two or more of a name, a phone number, or a postal address to the account information of the subscriber account by the evaluation application,
after receiving the request, accessing by the evaluation application a plurality of mobile communication service provider data stores that comprise information on mobile communication service provisioning events, wherein these events comprise at least one of voice mail redirect events of the mobile communication device, a history of the changing out of the mobile communication device for other mobile communication devices events, a payment history associated with the mobile communication devices events, and adding international calling service events,
generating a confidence report about the trustworthiness of the account applicant based on the information found in the plurality of data stores, and
transmitting the confidence report to the enterprise new accounts server by the evaluation application.

8. The method of claim 7, wherein the evaluation application generates and transmits the confidence report in less than a second after receiving the request.

9. The method of claim 7, wherein the evaluation server is associated with a mobile communication service provider.

10. The method of claim 7, wherein the plurality of mobile communication service provider data stores also comprise information about the account applicant about changed addresses, and a suspension of a line for the mobile communication device of the account applicant.

11. The method of claim 7, wherein the plurality of mobile communication service provider data stores comprise call records of applicants.

12. The method of claim 7, wherein the information in the plurality of mobile communication service provider data stores has a time to live value.

13. The method of claim 12, wherein the time to live value for the information in the plurality of mobile communication service provider data stores is one of a month, 2 months, 6 months, and a year.

14. A method of predicting trustworthiness in account applicants using an evaluation server, comprising:
receiving a request from an enterprise new accounts server to match a mobile communication device to an account applicant by an evaluation server, wherein the account applicant inputs information about a mobile communication device associated with the account applicant to the enterprise new accounts server,
accessing a device and number management and trustworthiness data store by the evaluation server, wherein the device and number management and trustworthiness data store comprises information about the status of the mobile communication device of the account applicant and comprises information about the use of the mobile communication device by the account applicant to be correlated with untrustworthiness, wherein the information in the device and number management and trustworthiness data store is associated with a mobile communication service provider, and
after accessing the data in the device and number management and trustworthiness data store, transmitting by the evaluation server the data received from the device and number management data store and trustworthiness data store to the enterprise service subscriber server.

15. The method of claim 14, wherein use of the mobile communication device by the account applicant that correlates with untrustworthiness comprises a history of late payments, no payments, and voice mail redirect events.

16. The method of claim 14, wherein the device and number management and trustworthiness data store comprises the contact number of the mobile communication device of the account applicant, and the address of the account applicant.

17. The method of claim 14, wherein there are multiple enterprises associated with the enterprise new accounts server.

18. The method of claim 14, wherein the account applicant inputs the information to the enterprise new accounts server via a plurality of web pages associated with the enterprise new accounts server.

19. The method of claim 14, wherein there is an option for account applicants to give or not to give out their information via device and number management and trustworthiness the data store.

20. The method of claim 19, wherein the mobile communication service provider has the option to give or not to give the information in the device and number management and trustworthiness data store.

* * * * *